United States Patent Office 2,836,888
Patented June 3, 1958

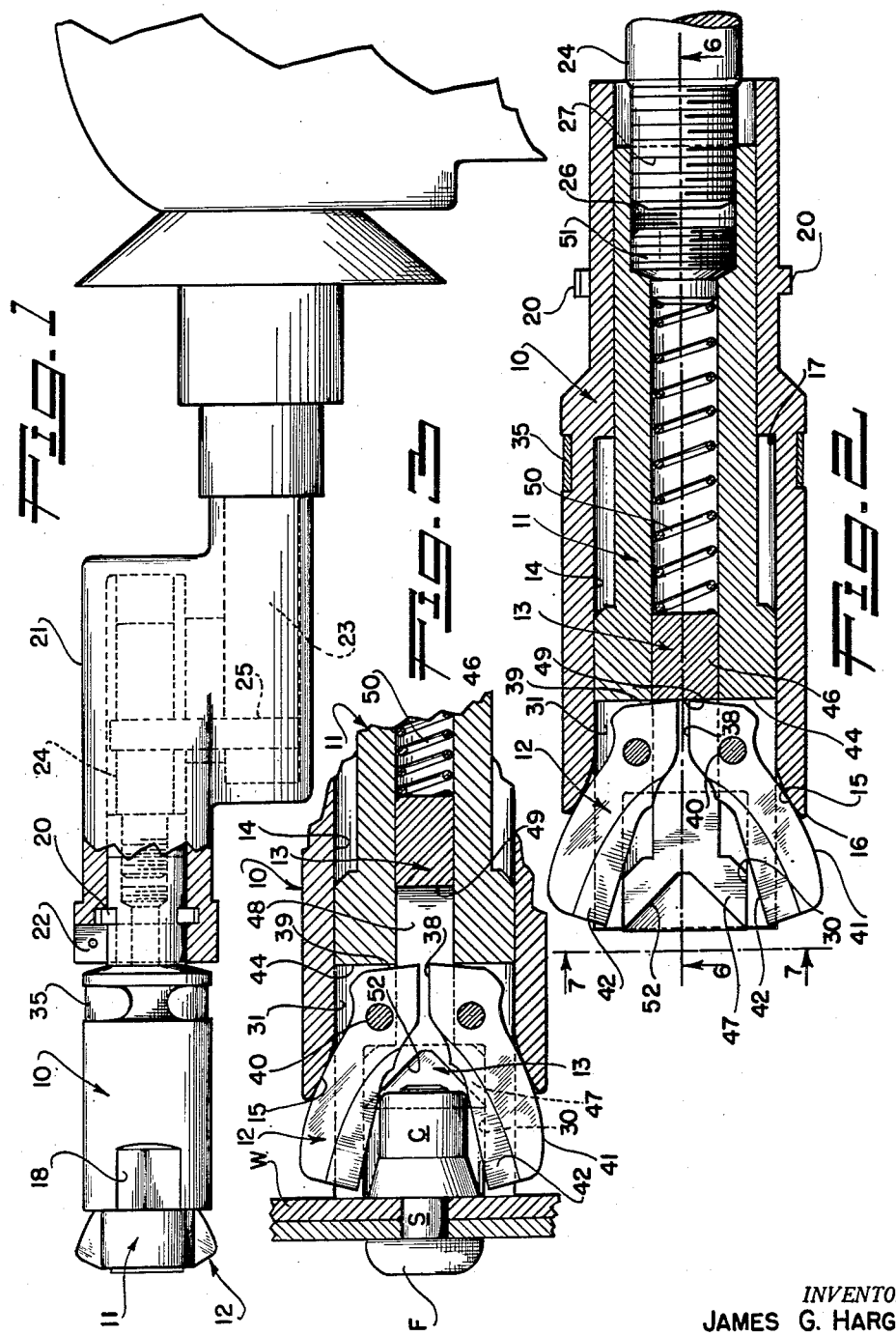

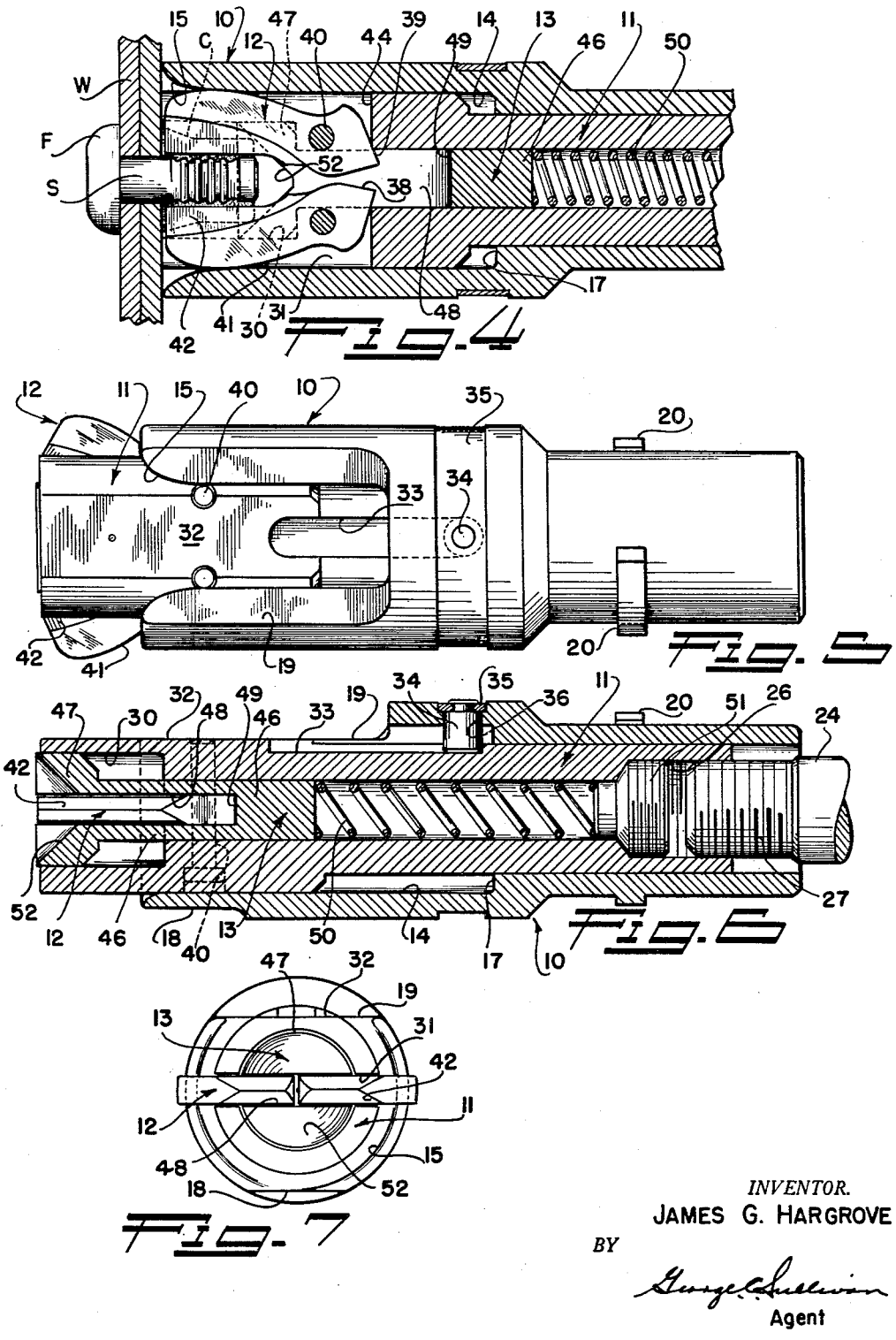

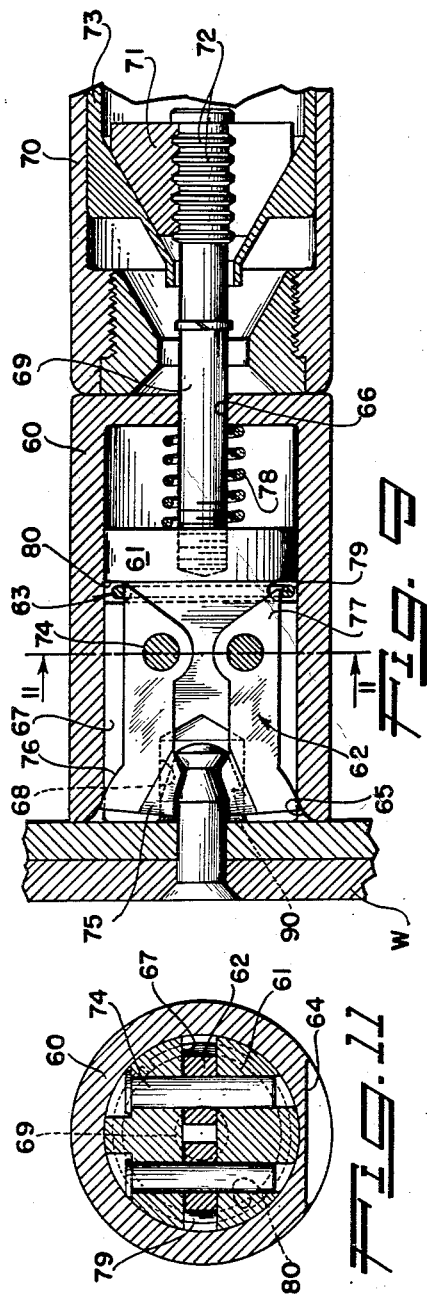

2,836,888
TOOLS FOR REMOVING THE COLLARS OF FASTENERS

James G. Hargrove, Northridge, Calif., assignor to Lockheed Aircraft Corporation, Burbank, Calif.

Application November 23, 1956, Serial No. 623,914

10 Claims. (Cl. 30—272)

This invention relates to tools useful in facilitating the removal of fasteners and relates more particularly to tools for cutting or splitting the collars of blind bolts, blind rivets, as well as the retaining elements and members of other fastening devices, etc.

So-called "blind" rivets and bolts are used extensively in the fabrication of aircraft, trucks, trailers, and other vehicles and devices. These fasteners usually embody a head, collar, or the like, that is permanently swedged or otherwise fixed to the shank of the fastener at one side of the work to secure the workpieces together and to permanently retain the fastener. Frequently it becomes necessary to remove such a fastener or perhaps a row or series of such fasteners in the event of faulty installation, erroneous assembly, for modification purposes, and for other reasons. The very nature of the fasteners themselves and their mode of installation makes it extremely difficult to free the fasteners for removal. Cold chisels are commonly used for this purpose, being employed to cut or spit the heads or collars of the fasteners, and sometimes the bolts or rivets are punched or driven out of the work. These methods are time consuming and therefore costly and often injure or destroy the workpieces or assemblies themselves.

It is, therefore, a general object of this invention to provide simple, effective tools operable to readily and quickly split the collars, heads, etc. of fasteners from their studs or shanks to allow the free easy removal of the fasteners.

Another object of the invention is to provide tools of this kind that are readily engaged on the collars or heads of the fasteners to be operated by the power tools commonly used to drive or install the fasteners or by other means such as appropriate hand actuators. No special preparation of the fastener or tool is required and the tools of the invention are designed for immediate actuation by the power operated fastener driving or installing tools or, if desired, by suitable hand operated actuators.

It is another object of the invention to provide tools of the character described that do not damage the workpieces or structures from which the fasteners are to be removed. The tools incorporate blades or cutters that cut radially through and thereby split the heads or collars of the fasteners without damaging or even marking the work and without damaging or distorting the stem or shank of the fastener. This latter feature assures the easy removal of the rivet or bolt from the openings in the structure or work and, if desired, permits reuse of the rivet or bolt shank.

A further object of the invention is to provide tools of the class described that are capable of immediate reuse, incorporating spring means for restoring them to the open condition for engagement on the other fasteners.

A further object of the invention is to provide tools for facilitating the removal of fasteners that are small, compact and light in weight and, therefore, convenient to use.

Other objectives and features of the invention will become apparent from the following detailed description of the typical preferred embodiments of the invention illustrated in the accompanying drawings in which:

Figure 1 is a side elevation of one form of tool of the invention arranged on a power actuating device or tool, a portion of the latter being in cross section to illustrate the connection with the tool of the invention;

Figure 2 is an enlarged longitudinal detailed sectional view of the cutting tool illustrated in Figure 1 with the parts in the idle or unactuated positions;

Figure 3 is a fragmentary, longitudinal sectional view illustrating the tool engaged on a fastener with the blades or cutters partially actuated;

Figure 4 is a view similar to Figure 3 showing the blades or cutters in the fully actuated position;

Figure 5 is a side elevation of the tool;

Figure 6 is a longitudinal, detailed sectional view taken as indicated by line 6—6 on Figure 2;

Figure 7 is an end elevation of the tool taken as indicated by line 7—7 on Figure 2;

Figure 8 is a longitudinal, detailed, sectional view of another embodiment of the invention arranged in position at a fastener;

Figure 9 is a longitudinal, detailed, sectional view of the tool of Figure 8 in the actuated condition and illustrating a portion of the actuating tool or device;

Figure 10 is an end elevation of the tool of Figures 8 and 9; and

Figure 11 is a tranverse sectional view taken as indicated by line 11—11 on Figure 9.

The tools of the invention are intended to split or remove the collars, heads, etc. of bolts, rivets, and like fasteners of various makes and types. Where the term "collar" is employed it is intended to mean the head, sleeve, nut, collar, or similar member swedged, threaded, or otherwise secured on the shank of a fastener such as a bolt or rivet to retain the same in the work. In the drawings I have shown two exemplary tools of the invention employed to remove the collars of two well known types of fasteners, it being understood that the invention is not to be considered as restricted to these particular embodiments and uses since the tools may be used and, if desired, modified in proportions, etc. to remove the collars, heads, and analogous parts of fasteners, and the like, of other types, configurations and proportions.

The tool of the invention illustrated in Figures 1 to 7 inclusive of the drawings may be said to comprise, generally, a shell or body 10, a mandrel 11 having limited axial relative movement in the body 10, cutters or blades 12 carried by the mandrel to be actuated by relative movement between the body and mandrel, and control or return means 13 for the mandrel and blades.

The shell or body 10 is a tubular member having a central longitudinal opening 14 extending therethrough. The outer end portion of the opening 14 is flared, being tapered or rounded to present a circular or partially circular cam face 15 which slopes or curves radially inward and axially for the actuation of the blades 12 as will be more fully described. The outer extremity of the body 10 is rounded and machined smooth so as not to scratch or mar the surface of the work W. The inner end portion of the body 10 is preferably reduced in external diameter and the inner portion of the opening 14 is reduced in diameter so that the opening has an annular shoulder 17 facing outwardly or forwardly. As best illustrated in Figures 5, 6 and 7, the outer or forward portion of the body 10 has diametrically opposite flats 18 and 19 to reduce the "diameter" or thickness of the body so as to adapt the tool to engage on fasteners that may be adjacent flanges, corners, or other obstructions on the work W. The flat 19, as shown, may be sufficiently deep or extensive to join or interrupt the opening 14 of the body 10 for a suitable distance.

The body 10 may be adapted or equipped to be held in, engaged by and secured to operating devices and tools of selected types. In the particular case illustrated the reduced end portion of the body 10 has two or more external lugs 20. This portion of the body 10 is adapted to be inserted in the tubular end of a power actuator 21 and the lugs 20 are intended to be locked in bayonet-type slots therein by a key block 22.

While the present invention is not primarily concerned with the type or details of the unit for actuating the collar splitting tool, it is believed it will be helpful to briefly describe the portion of the unit or actuator 21 illustrated in the drawings. The actuator 21 is a manually portable and manually handled device having a fluid pressure actuated ram or piston 23 connected with a slidable rod 24 by a transverse pin 25. The mandrel 11 is connected with the rod 24, as will be later described, to be actuated thereby when the workman or operator puts the unit 21 into operation by depressing a pedal or by moving a trigger, not shown.

The mandrel 11 is an elongate tubular member movable or slidable axially in the opening 14 of the shell or body 10. The rear or inner end of the mandrel 11 has an internal thread 26 to mate with a thread 27 on the end of the actuator rod 24 so that the mandrel is moved by the rod while the body 10 is secured to the unit or actuator 21 proper by the lugs 20 and key block 22, above described. The forward or outer portion of the mandrel 11 is enlarged in external diameter to slide in the outer portion of the body opening 14. The forward or outer portion of the mandrel 11 has a counterbore 30 and a diametric slot 31 intersecting the counterbore. The slot 31 receives or partially houses the blades 12. The mandrel 11 also has an external flat 32, see Figures 5, 6 and 7, in the same plane as the flat 19 of the body to allow the tool to be employed as near as possible to obstructions on the work W. The invention includes means for limiting axial movement of the mandrel 11 and for preventing rotation or angular movement of the mandrel in the body 10. This means includes an axial external groove 33 of limited length in the mandrel 11 and a stop pin 34 carried by the body 10 and extending into the groove. The stop pin 34 is secured to a spring clip 35 seated in an annular groove in the body 10 and the pin 34 extends through an opening 36 in the wall of the body to project into the groove 33. Engagement of the end walls of the groove 33 with the pin 34 stops or limits travel of the mandrel 11 in the body 10 and the pin cooperates with the side walls of the groove to prevent angular or rotary motion of the mandrel.

The cutters or blades 12 are pivotally supported in the slot 31 of the mandrel 11 to be actuated between open or idle positions and actuated inner positions by the action of the cam face 15 when the mandrel 11 is actuated rearwardly relative to the body 10. There are two like or complementary blades 12, each having a fulcrum region bounded or defined, in part, by relatively straight angular edges 38 and 39. Pivot pins 40 are engaged in parallel openings in the mandrel 11 and pass through openings in the fulcrum regions of the blades 12 to pivotally support the blades in the slot 31. The blades 12 have curved outer surfaces 41, designed to ride on or engage with the cam face 15 and have sharpened V-shaped inner edges 42 for cutting into or through the head or collar C of the fastener F. The side faces of the blades 12 are flat and parallel and may cooperate with the walls of the slot 31 to guide the blades during their cutting action. The blades 12 are movable between the fully open position of Figure 2 where their cutting edges 42 are in outwardly divergent relation and the fully actuated positions of Figure 4 where the cutting edges 42 are substantially parallel. When in the latter position the blades 12 will have cut substantially completely through the wall of the collar C and will have split the collar free from the stud or shank S of the fastener, the cam face 15 cooperating with the curved edges 41 of the blades serving to positively actuate or force the blades to these collar splitting positions. It is important that the blades 12 be stopped at these positions where they have some slight clearance with the shank S so they do not cut, groove or form burrs on the shank to interfere with its subsequent removal from the work W. The abovementioned faces or edges of the fulcrum regions of the blades 12 are formed and related so that the edges 39 engage the end walls 44 of the slot 31, as seen in Figure 4, to stop the blades in their actuated positions, that is to limit the inward actuation of the blades so as to have their cutting edges 42 immediately adjacent, substantially parallel to, but clear of the shank S when fully actuated.

The means 13 for restoring the blades 12 to their idle positions following use of the tool and for normally yieldingly holding the blades 12 in their open positions, includes a pin 46 slidable in the tubular mandrel 11 and having a head 47 on its end slidable in the counterbore 30 of the mandrel, see Figure 6. The pin 46 and its head 47 have a diametric slot 48 registering with the slot 31 of the mandrel 11 to accommodate the cutting blades 12. The end wall 49 of this slot 48 is cooperable with the fulcrum edge faces 39 of the blades 12. A spring 50 is arranged under compression between the inner end of the pin 46 and a plug 51 in the mandrel 11. The spring 50 urges the pin 46 outwardly or toward the work W. The end wall 49 of the slot 48 engages or acts on the faces 39 of the blades 12 so that the spring urged pin normally holds the blades 12 in their open or idle positions, shown in Figure 2. The blade restoring means 13 also serves to assist in locating the tool on the fastener F where the blades 12 will properly split its collar C. The outer end of the pin head 47 has a tapered recess 52 shaped and proportioned to receive the end of the collar C when the tool is initially brought into contact with the fastener. The pin recess 52 may, of course, be shaped and proportioned to cooperate with or receive the collars or heads of fasteners of different makes, types and sizes and in this connection it is to be understood that the cutters or blades 12 may be shaped, proportioned and mounted so as to properly cut or split the collars or heads of different classes, makes and sizes of fasteners. The initial engagement of the recess 52 with the collar C and the mandrel urging of the tool toward the work W results in retraction of the pin 46 to a position such as shown in Figure 3 where its wall 49 is clear of the blades 12 to allow the blades to be actuated by the cooperation of the cam face 15 with the blade edges 41.

It is believed that the operation of the tool illustrated in Figures 1 to 7 inclusive of the drawings will be readily understood from the foregoing detailed description. Assuming the tool to be properly secured to the actuating unit 21 the unit and tool are brought to a position where the recess 52 engages the collar C of the fastener F to be removed. The workman or operator while urging the unit 21 and the tool toward the work actuates the unit 21 so that the rod 24 forcibly moves the mandrel 11 rearwardly or away from the work W. This results in relative movement between the body 10 and the mandrel 11, which relative movement is accompanied by coaction of the cam base 15 and the blade surfaces 41 causing the blades 12 to pivot inwardly to the positions illustrated in Figure 4. During this action the blades 12 cut substantially through the walls of the fastener collar C and split the collar so that it falls away from the shank S of the fastener. It is important to note that this inward actuation or pivoting of the blades 12 is limited as above described by the engagement of the blade surfaces 39 with the wall 34 of the mandrel so that the blades do not themselves engage, cut or mar the shank S. The tool is then disengaged from the work and is ready for reuse. It should be observed in Figure 4 that the smooth finished end 16 of the body 10 is the only portion of the tool that engages the work W and this engagement does not mar or damage the work W during the collar splitting or removing operation.

Figures 8 to 11 inclusive of the drawings illustrate another tool of the invention. I have shown this embodiment employed to cut or split the collar 90 of a somewhat different type of fastener, it being understood that this again is merely an illustrative use or application of the invention. The tool illustrated in Figures 8 to 11 inclusive may be said to comprise, generally, a tubular body 60, a mandrel 61 movable in the body, blades 62 carried by the mandrel to be actuated upon relative movement between the body and the mandrel, and spring means 63 for restoring the blades to their idle positions following actuation.

The shell or body 10 may be a simple generally cylindrical hollow or tubular member. I have shown the exterior of the body 60 provided with a flat 64 to facilitate use of the tool where the fasteners to be removed may be adjacent obstructions on the work. The forward end of the body 60 has a flared entrance or mouth presenting a tapered or curved cam surface 65 resembling the above described cam surface 15. The rear end of the body 60 has a central longitudinal opening 66 of reduced diameter.

The mandrel 61 is movable or slidable axially in the body 60 and is adapted to protrude from the forward end of the body. A diametric slot 67 is provided in the mandrel 61 to house or receive the blades 62. The forward or outer end of the mandrel 61 is flat and perpendicular to its longitudinal axis to flatly engage the surface of the work W. A counterbore or socket 68 is provided in the end of the mandrel 61 to receive the collar 90 of the fastener. The counterbore or socket 68 is preferably shaped and proportioned to fairly accurately receive the collar 90 and thereby locate and centralize the tool with respect to the fastener. The rear portion of the mandrel 61 is in the nature of a stem 69 of reduced diameter which slidably passes through the opening 66 to protrude from the rear end of the body 60.

The mandrel stem 69 may be connected with or secured to the actuator of the selected class in any appropriate manner. For example, the mandrel stem 69 may have screw threaded connection with the rod 24 of the above described actuating unit, may be equipped with an adapter for connection with a selected actuator, either power driven or manually operated, or may be of special configuration for engagement by the tools commonly used to install or "drive" the fasteners. The particular fastener illustrated in Figures 8 and 9 is of the general type manufactured by Huck Manufacturing Company, Detroit, Michigan, and I have shown a portion of a "gun" or device 70 of the type marketed by the Huck Manufacturing Company for actuating the collar cutting tool, both the fastener and device 70 being of the class disclosed in United States Patent No. 2,531,048, November 21, 1950. The fastener driving tool 70 has one or more jaws 71 adapted to mate with a plurality of annular ridges 72 on the stem 69, the wedges being actuated by a cone member 73 to pull the stem 69 and thus move the mandrel 61 outwardly relative to the body 60. The end of the gun or actuator 70 is adapted to engage against the rear end of the tool body 60.

The cutters or blades 62 are supported in the slot 67 of the mandrel on pivot pins 74. The pivotal axes of the blades 62 are spaced and parallel and the inner faces or sides of the blades have sharpened V-shape cutting edges 75 shaped and proportioned to cut through or split the fastener collar 90. The outer edges of the blades 62 are sloped or curved at 76 to cooperate with the cam face 65. The rear ends of the blades 62 have tails or projections 77 for engagement by the spring return means 63. As shown in Figures 10 and 11, the sides of the blades 62 are flat and parallel and the walls of the slots 67 may cooperate therewith to assist in guiding the blades.

The spring means 63 for normally holding the blades 62 in their open or unactuated positions where they are free to engage over the fastener collar 90 and for restoring the blades to these positions, includes two springs 78 and 79. The spring 78 surrounds the stem 69 and is engaged under compression between the body of the mandrel 61 and the rear wall of the body 60. The spring 78 urges the mandrel 61 outwardly toward the work W and thus conditions the blades 62 for cooperation with the cam face 65. The spring 79 is a split annular spring member freely arranged in an annular groove 80 in the mandrel 61. The spring 79 is arranged to cooperate with the outer edges of the blade tails or projections 77 to urge or pivot the blades 62 on their pins 74 to the expanded or idle positions.

In employing the tool of Figures 8 to 11 inclusive, it is brought to a position where the socket 68 of the mandrel receives or engages the fastener collar 90 and where the end of the mandrel 61 bears against the face of the work W. The workman while urging the tool toward the work actuates the gun 70 so that the stem 69 and mandrel 61 are forcibly moved to the rear or away from the work W. This causes the cam face 65 to cooperate with the edges 76 of the blades 62 to force the cutting edges 75 of the blades into and through the wall of the collar 90. At the same time the body 60 of the tool moves toward the work W and its end face ultimately engages against the work to stop or limit the action. The parts are constructed and related so that the cutting edges 75 of the blades 72 cut substantially through the wall of the fastener collar 90 and yet do not directly engage the shank or body of the fastener, leaving the fastener undamaged for ready removal from the work W. Following actuation of the tool it is removed from the work W and the spring 78 restores the mandrel 61 to its position where it projects from the body 60 and the spring 79 pivots the blades 62 to their open or idle positions.

Having described only typical forms of the invention I do not wish to be limited to the specific details herein set forth, but wish to reserve to myself any variations or modifications that may appear to those skilled in the art.

I claim:

1. A tool for cutting the collar of a fastener comprising a shell having an open end, an internal cam face on said end, a mandrel in the shell, the shell and mandrel having a common longitudinal axis and being related for relative axial movement, cutters supported on the mandrel for pivotal movement about spaced axes spaced at opposite sides of said longitudinal axis and having spaced opposing inner cutting edges, the cutters having outer edges cooperating with said cam face upon relative movement between the shell and mandrel to pivot the blades in one direction and thus move the cutting edges toward one another, yielding means urging the blades to pivot in the other direction, and means associated with the mandrel for engaging with the collar to position the cutters in cutting relation thereto.

2. A tool for facilitating the removal of a collar from a fastener comprising a shell, a mandrel in the shell, the shell and mandrel being related for relative longitudinal movement, a cam face in the shell, blades pivotally supported on the mandrel, parts on the blades cooperable with the cam face, means yieldingly urging the mandrel to a position where the blades project beyond the shell to be disposed at the sides of the collar and to have their said parts in engagement with the cam face, means associated with the mandrel and having a recess for receiving the collar to thus position the blades at the collar, and means for effecting relative movement between the shell and mandrel whereby the cam face cooperating with said parts pivots the blades to split the collar.

3. A tool for removing a collar from a fastener secured in work comprising a housing body having an open end adapted to engage against the work, an internal cam face in the body at said end, a mandrel in the body, the body and mandrel being related for relative longitudinal movement, blades pivoted on the mandrel having active end regions provided with opposing cutting edges and having tail regions, the blades being adapted to protrude from said open end of the body to have their active end regions engage the cam face and to have their cutting edges disposed at opposite sides of the collar, and spring means acting on said tail regions of the cutters to hold the blades in said protruding positions so that upon relative axial movement of the body and mandrel said cam face moves the active blade regions toward one another to have the cutting edges split the collar.

4. A tool for removing a collar from a fastener secured in work comprising a housing body having an open end adapted to engage the work, an internal cam face in the body at said end, a mandrel in the body, the body and mandrel being related for relative longitudinal movement, blades pivoted on the mandrel having active end regions provided with opposing cutting edges and having tail regions, the blades being adapted to protrude from said open end of the body to have their active end regions engage the cam face and to have their cutting edges disposed at opposite sides of the collar, means associated with the mandrel for engaging over the collar to locate the blades in cutting relation thereto, and spring means acting on said tail regions of the cutters to hold the blades in said protruding positions so that upon relative axial movement of the body and mandrel said cam face moves the active blade regions toward one another to have the cutting edges split the collar.

5. A tool for removing a collar from a fastener secured in work comprising a housing body having an open end adapted to engage against the work, an internal cam face in the body at said end, a mandrel in the body, the body and mandrel being related for relative longitudinal movement, blades pivoted on the mandrel having active end regions provided with opposing cutting edges and having tail regions, the blades being adapted to protrude from said open end of the body to have their active end regions engage the cam face and to have their cutting edges disposed at opposite sides of the collar, a pin movable axially with respect to the mandrel and engaging said tail regions of the blades, the pin having a recess for receiving the collar to center the tool with respect thereto, spring means acting on the pin to yieldingly hold the blades where their cutting edges may be positioned adjacent the sides of the collar and conditioning the pin to have its recess receive the collar, and means on the body and mandrel engageable to produce relative axial movement therebetween so that the cam face actuates the blades to cut through the collar.

6. A tool for removing a collar from a fastener secured in work comprising a housing body having an open end adapted to engage against the work, an internal cam face in the body at said end, a mandrel in the body, the body and mandrel being related for relative longitudinal movement, a spring loaded pin movable axially in the mandrel, the mandrel and pin having registering diametric slots, a pair of blades operable in the slots and pivoted on the mandrel to have spaced opposing inner edges, cutting edges on said inner edges, a cam face on the interior of the body, the outer edges of the blades being curved to cooperate with the cam face, the blades having tail regions, a surface on said pin engaging with said tails to urge the mandrel and blades to positions where the blades have their cutting edges at opposite sides of the collar, and means on the body and mandrel engageable to produce relative axial movement therebetween so that the cam face engaging said curved outer edges of the blades actuates the blades to cut through the collar.

7. A tool for removing a collar from a fastener secured in work comprising a housing body having an open end adapted to engage against the work, an internal cam face in the body at said end, a mandrel in the body, the body and mandrel being related for relative longitudinal movement, a spring loaded pin movable axially in the mandrel, the mandrel and pin having registering diametric slots, a pair of baldes operable in the slots and pivoted on the mandrel to have spaced opposing inner edges, cutting edges on said inner edges, a cam face on the interior of the body, the outer edges of the blades being curved to cooperate with the cam face, the blades having tail regions, a surface on said pin engaging with said tails to urge the mandrel and blades to positions where the blades have their cutting edges at opposite sides of the collar, the pin having an end surface for engaging the collar to locate the blades with respect thereto, and means on the body and mandrel engageable to produce relative axial movement therebetween so that the cam face engaging said curved outer edges of the blades actuates the blades to cut through the collar.

8. A tool for removing a collar from a fastener secured in work comprising a housing body having an open end adapted to engage against the work, an internal cam face in the body at said end, a mandrel in the body, the body and mandrel being related for relative longitudinal movement, a spring loaded pin movable axially in the mandrel, the mandrel and pin having registering diametric slots, a pair of blades operable in the slots and pivoted on the mandrel to have spaced opposing inner edges, cutting edges on said inner edges, a cam face on the interior of the body, the outer edges of the blades being curved to cooperate with the cam face, the blades having tail regions, a surface on said pin engaging with said tails to urge the mandrel and blades to positions where the blades have their cutting edges at opposite sides of the collar, means on the body and mandrel engageable to produce relative axial movement between the body and mandrel so that the cam face actuates the blades to split the collar, and means for limiting movement of the blades to prevent the blades from engaging the fastener proper.

9. A tool for removing a collar from a fastener secured in work comprising a housing body having an open end adapted to engage against the work, an internal cam face in the body at said end, a mandrel in the body, the body and mandrel being related for relative longitudinal movement, blades pivoted on the mandrel having active end regions provided with opposing cutting edges and having tail regions, the blades being adapted to protrude from said open end of the body to have their active end regions engage the cam face and to have their cutting edges disposed at opposite sides of the collar, the mandrel having an end recess for receiving the collar to locate the blades relative to the collar, spring means acting on the mandrel to yieldingly hold the mandrel and blades where they protrude from said end of the body to receive the collar, and means on the body and mandrel engageable to produce relative axial movement between the body and mandrel so that the cam face actuates the blades to split the collar.

10. A tool for removing a collar from a fastener secured in work comprising a housing body having an open end adapted to engage against the work, an internal cam face in the body at said end, a mandrel in the body, the body and mandrel being related for relative longitudinal movement, blades pivoted on the mandrel having active end regions provided with opposing cutting edges and having tail regions, the blades being adapted to protrude from said open end of the body to have their active end regions engage the cam face and to have their cutting edges disposed at opposite sides of the collar, the mandrel having an end recess for receiving the collar to locate the blades relative to the collar, spring means yieldingly urging the blades to positions where they engage the cam face and their cutting edges are spaced wide apart, spring means acting on the mandrel to yieldingly hold the mandrel and blades where they protrude from said end of the body to receive the collar, and means on the body and mandrel engageable to produce relative axial movement between the body and mandrel so that the cam face actuates the blades to split the collar.

References Cited in the file of this patent

UNITED STATES PATENTS

| | | |
|---|---|---|
| 239,817 | McCarty | Apr. 5, 1881 |
| 770,270 | Dehn | Sept. 20, 1904 |